Dec. 3, 1935. J. KUCHAR 2,023,233
POWER ACTUATED DUMP WAGON
Filed March 10, 1930 12 Sheets-Sheet 1
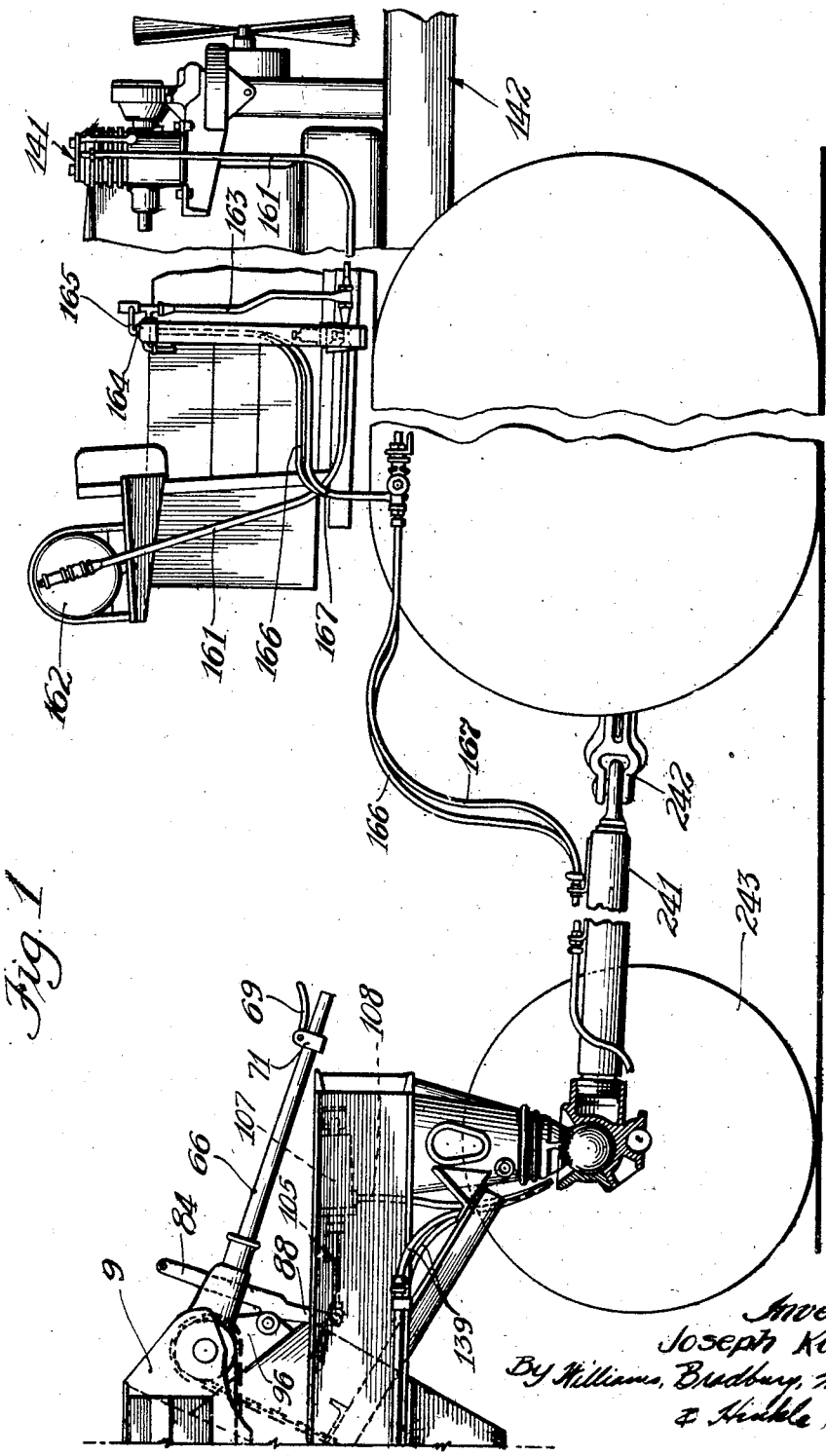

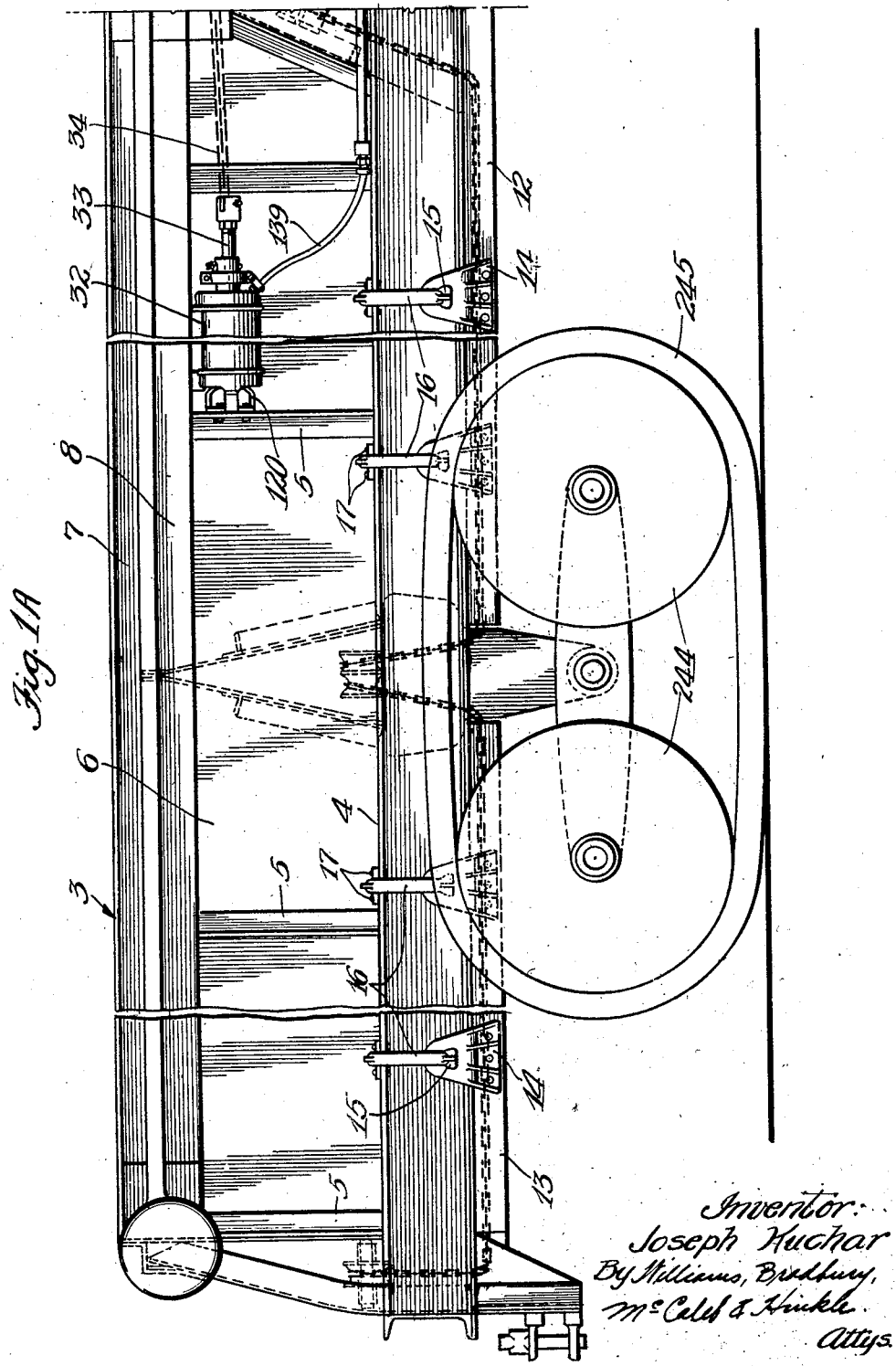

Dec. 3, 1935.  J. KUCHAR  2,023,233
POWER ACTUATED DUMP WAGON
Filed March 10, 1930  12 Sheets-Sheet 3

Inventor:
Joseph Kuchar

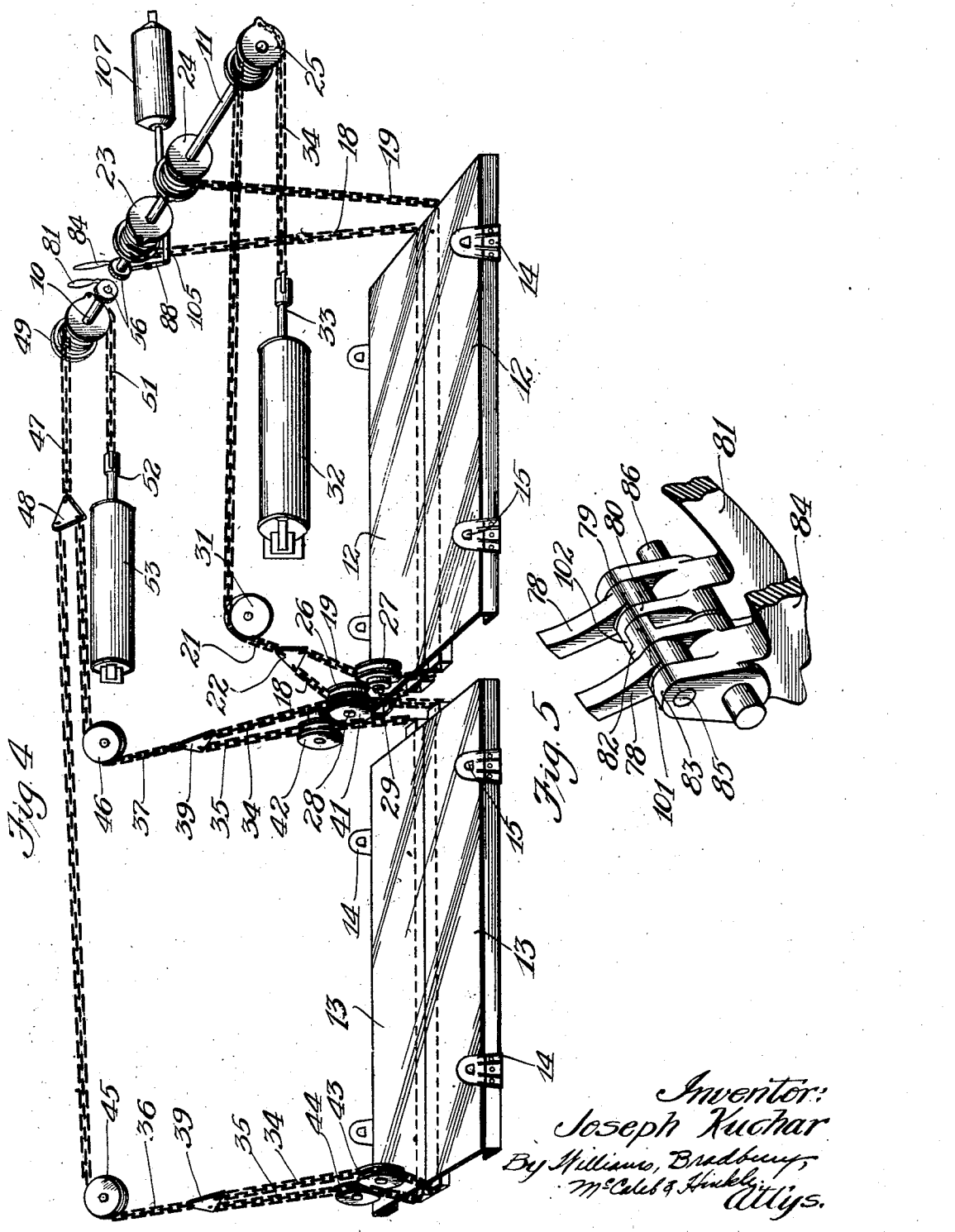

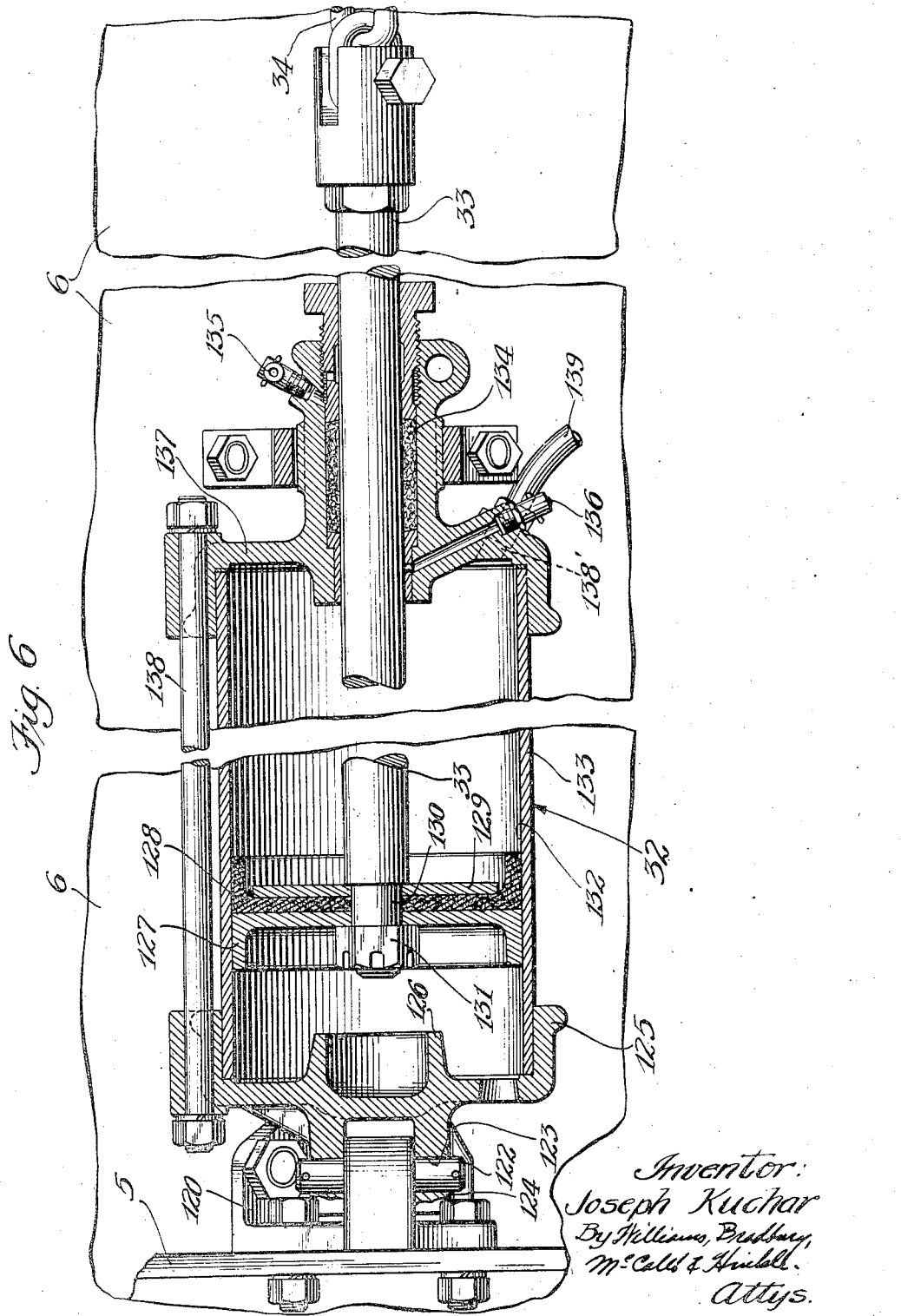

Dec. 3, 1935.  J. KUCHAR  2,023,233
POWER ACTUATED DUMP WAGON
Filed March 10, 1930   12 Sheets-Sheet 6
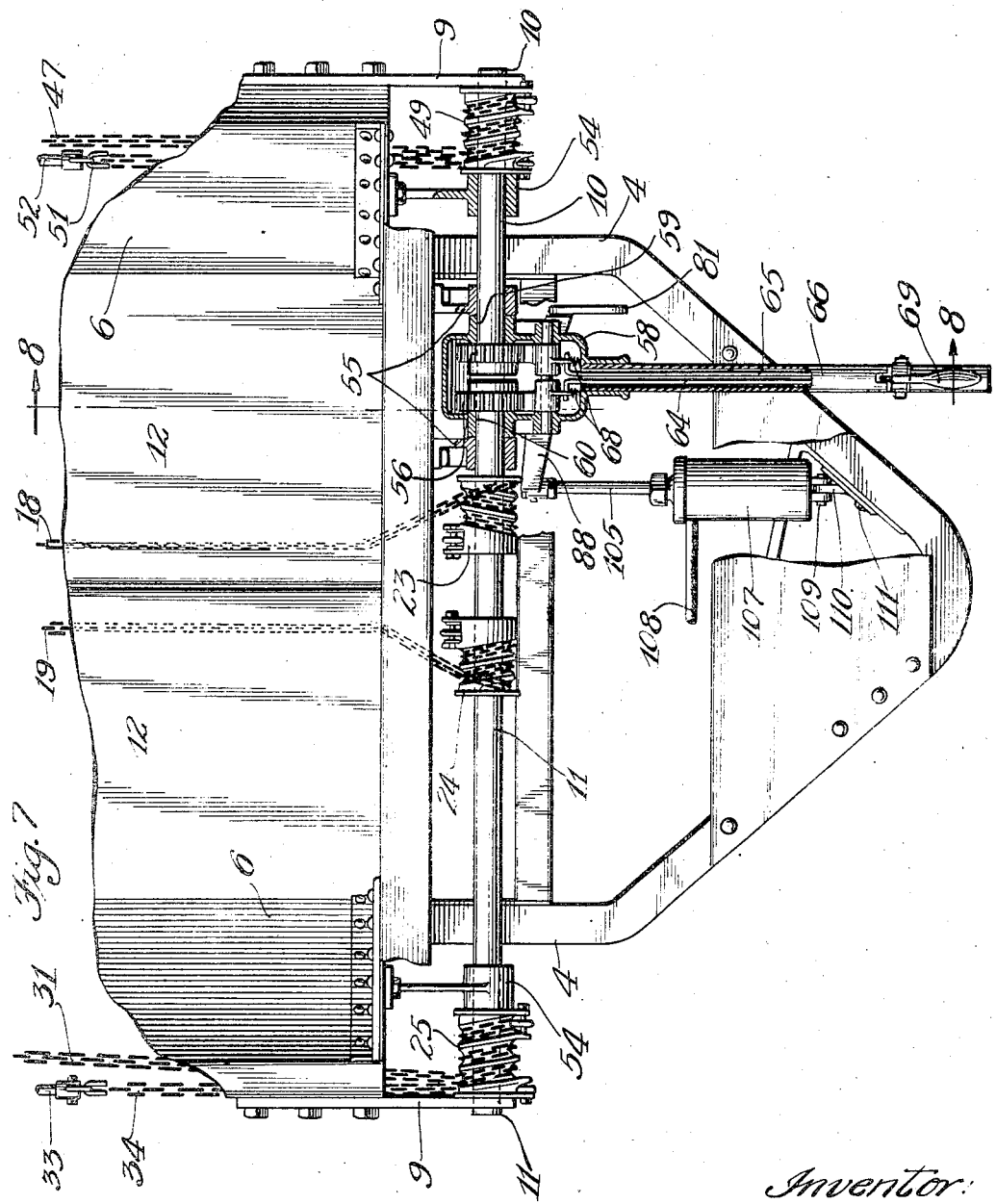
Inventor:
Joseph Kuchar
By Williams, Bradbury, McCaleb & Hinkle
Attys.

Dec. 3, 1935.  J. KUCHAR  2,023,233
POWER ACTUATED DUMP WAGON
Filed March 10, 1930   12 Sheets-Sheet 7
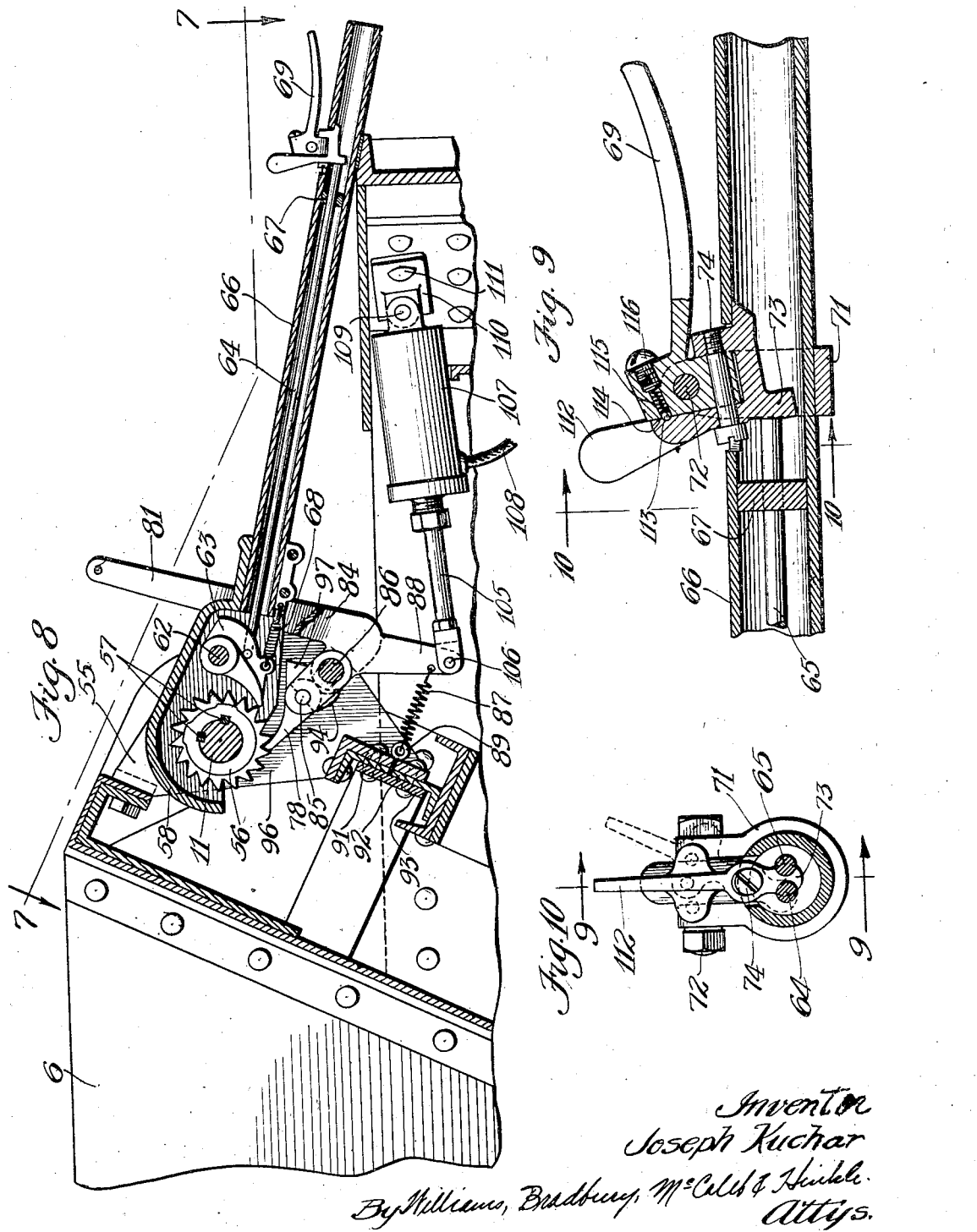

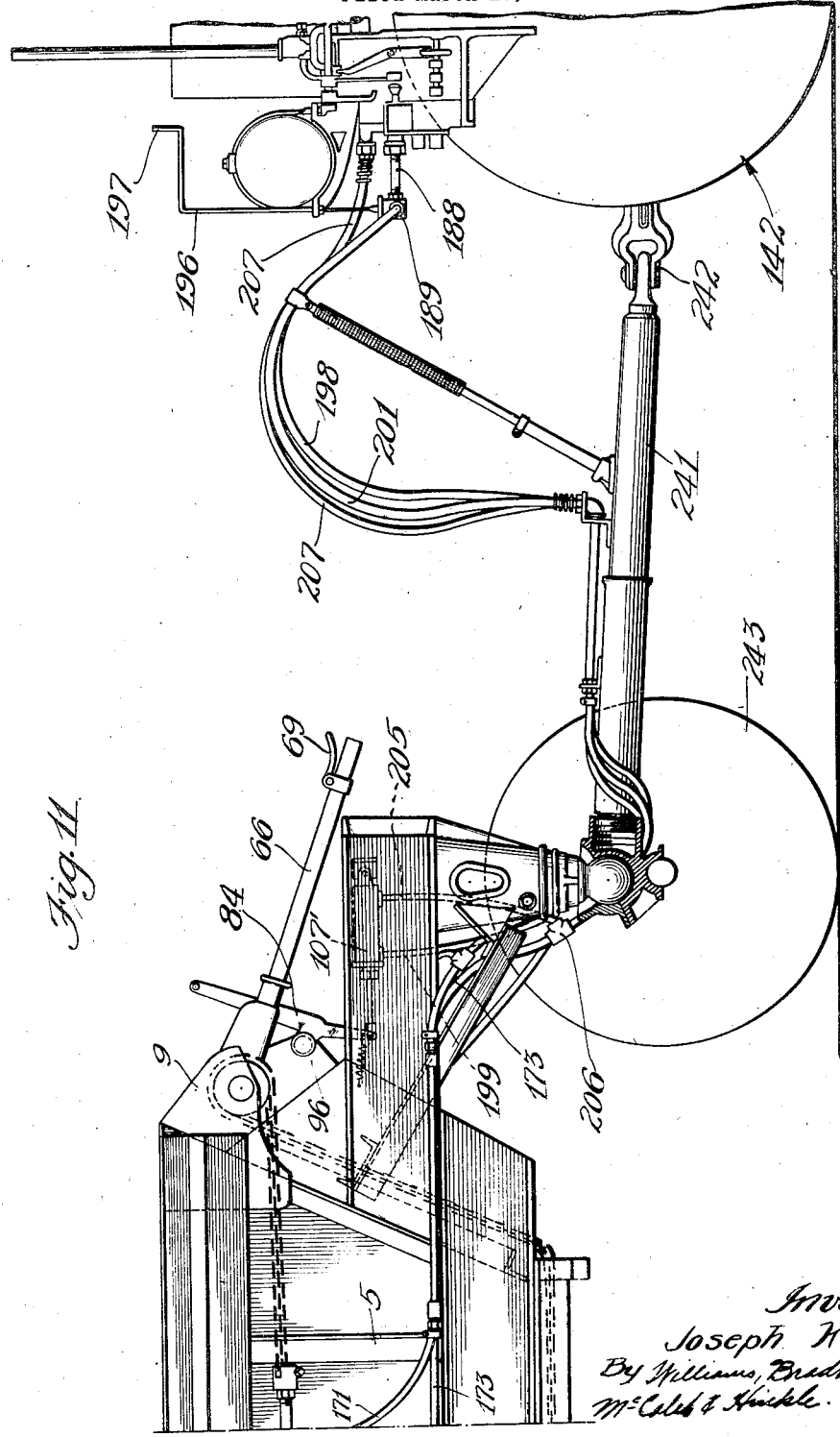

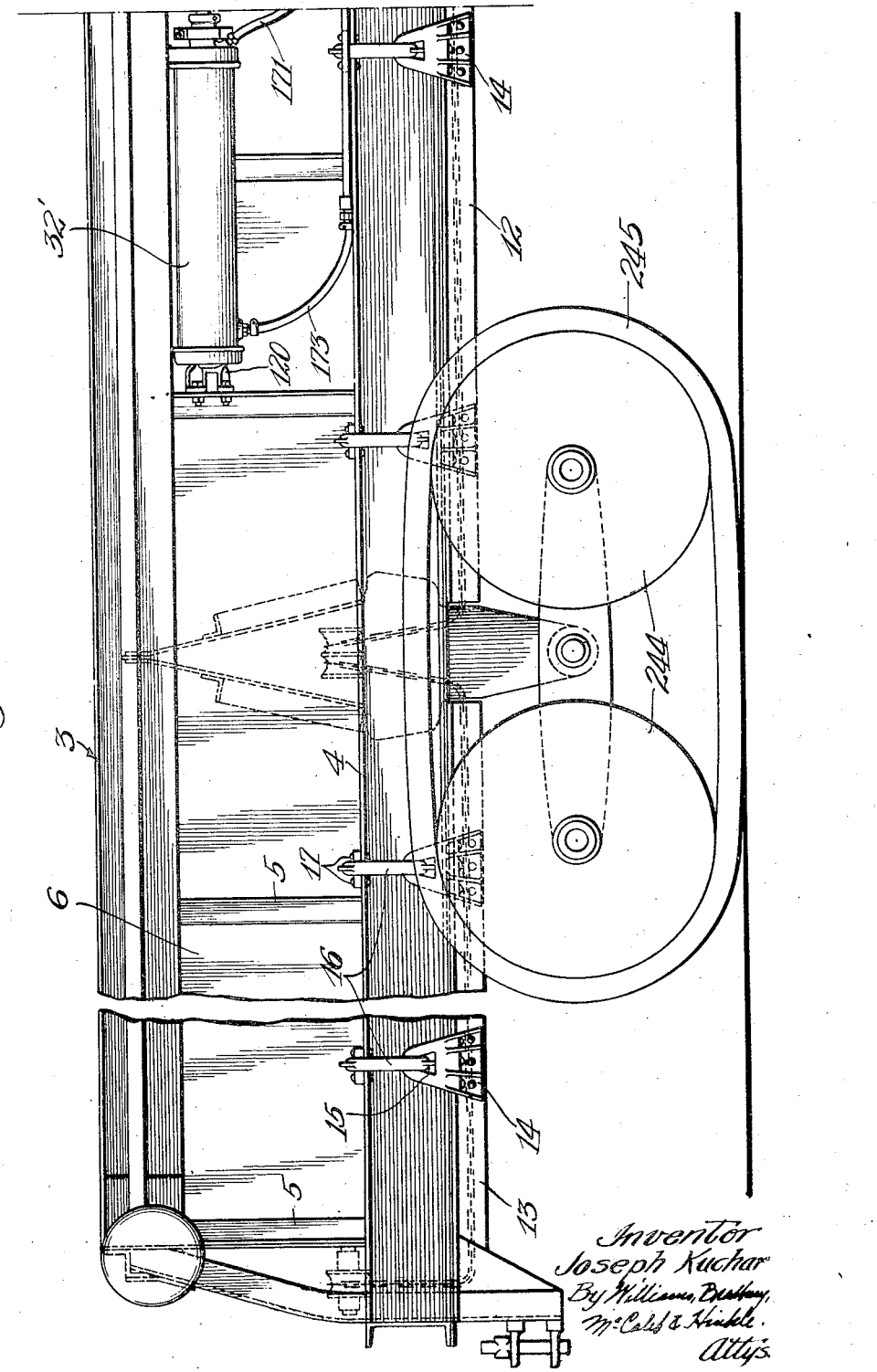

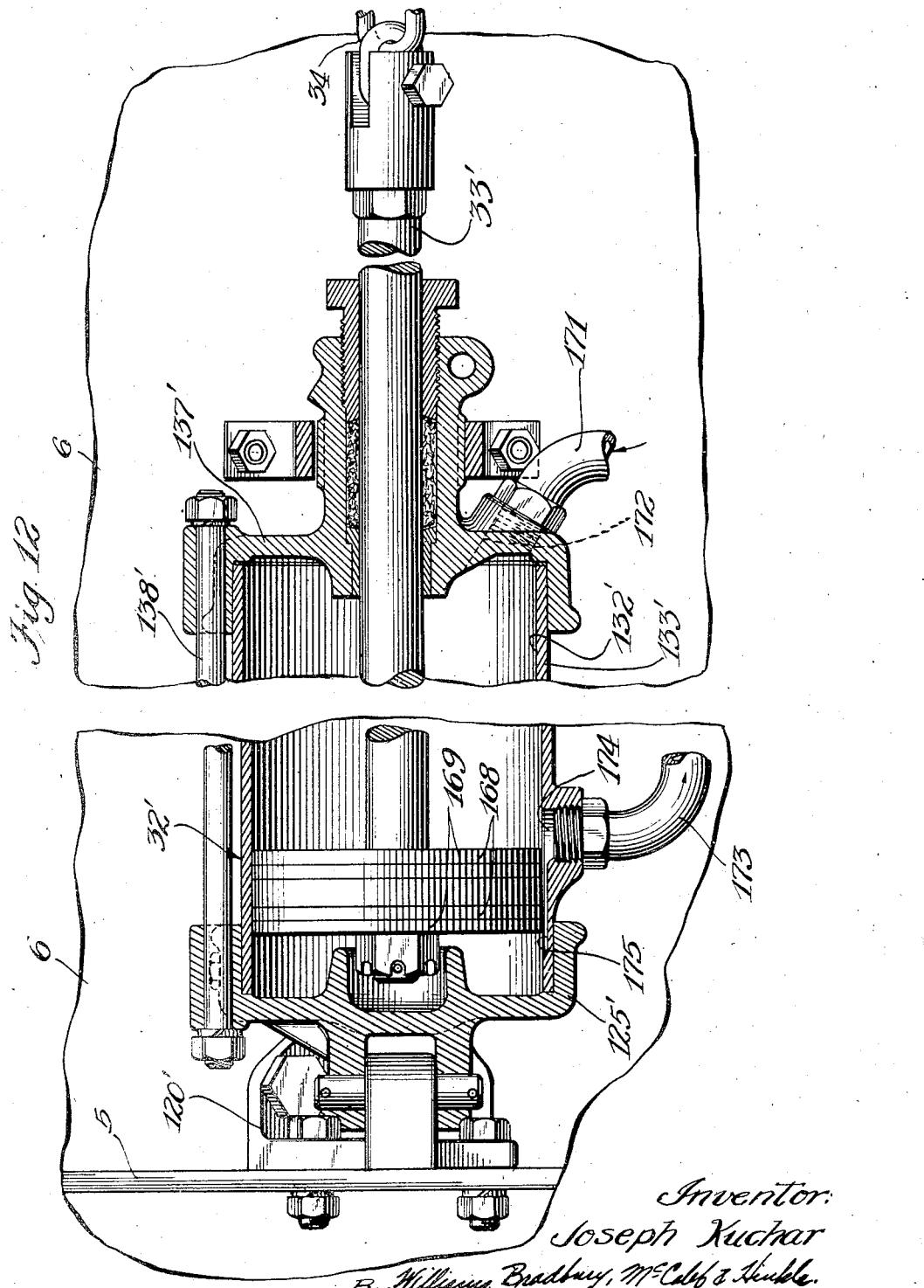

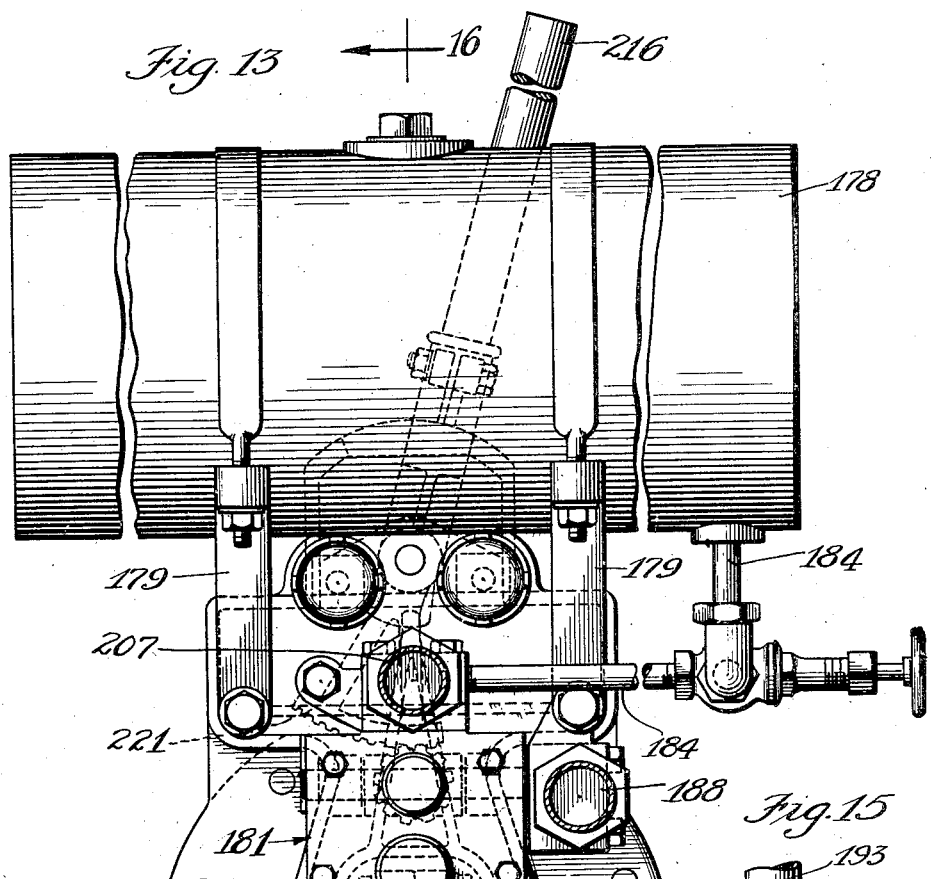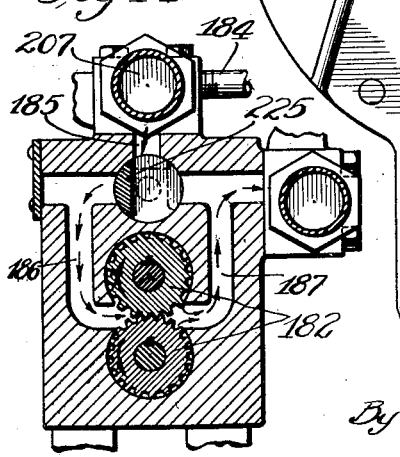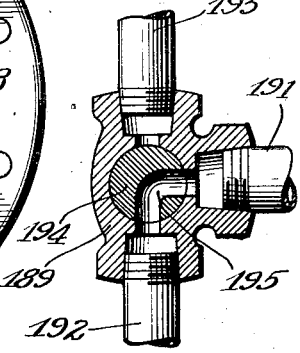

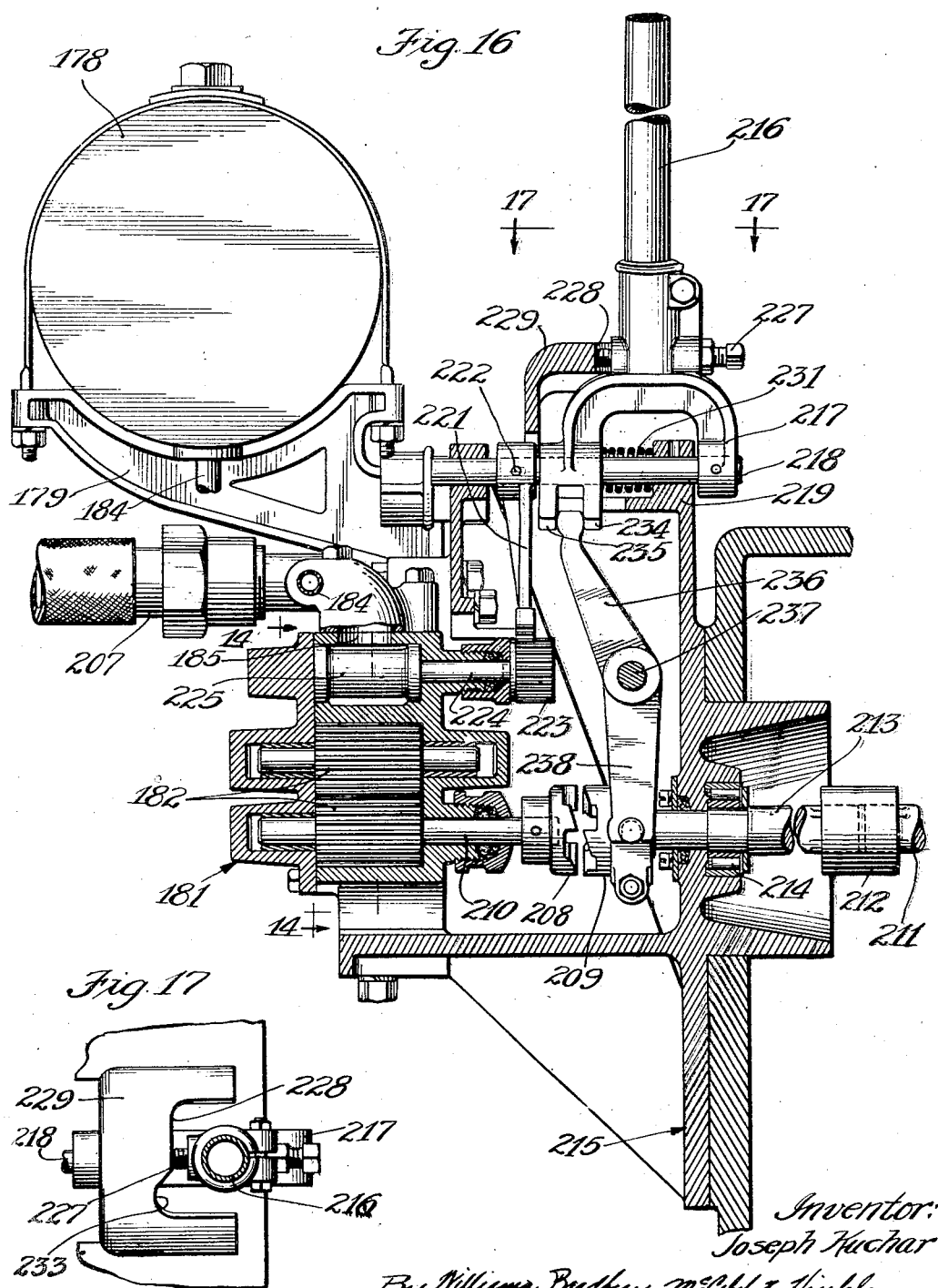

Patented Dec. 3, 1935

2,023,233

UNITED STATES PATENT OFFICE 2,023,233

POWER ACTUATED DUMP WAGON

Joseph Kuchar, Chicago, Ill., assignor to Athey Truss Wheel Co., Chicago, Ill., a corporation of Illinois Application March 10, 1930, Serial No. 434,577

18 Claims. (Cl. 298—35)

This invention relates to dump wagons and more particularly to a power operated dump wagon in combination with a power actuated operating means.

An object of this invention is the provision of a dump wagon which may be actuated either to dump or recondition the wagon for loading, by power from the tractor, and including control means accessible to the tractor driver whereby power may be selectively applied to perform the operation desired without the necessity of the driver leaving the tractor seat or stopping the tractor.

A further object is the provision of a trailer combined and associated with a tractor including a fluid pressure creating mechanism on the tractor driven by power from the tractor and having fluid pressure means leading to cylinders on the trailer whereby the actuation of doors on the trailer may be controlled from the tractor for dumping a load from the trailer.

Other objects and advantages will become apparent from the following description.

In the accompanying drawings,

Figure 1 is a fragmentary side elevation of a tractor attached to a trailer, the front end only of the latter being shown, and incorporating my invention;

Figure 1A is a side elevation of the main portion of the trailer, the front end of which is shown in Figure 1;

Figure 4 is a diagrammatic perspective of the doors and operating mechanism on the trailer for illustrating the manner of operation;

Figure 5 is a fragmentary perspective of a portion of the tripping mechanism further illustrated in Figure 8;

Figure 6 is an enlarged horizontal section through one of the operating cylinders;

Figure 7 is a plan view taken substantially on the line 7—7 of Figure 8 and showing some of the parts in section;

Figure 8 is a vertical section taken on the line 8—8 of Figure 7;

Figure 9 is a longitudinal section taken on the line 9—9 of Figure 10;

Figure 10 is a section taken on the line 10—10 of Figure 9;

Figure 11 is a side elevation of a fragment of a tractor coupled with a trailer incorporating a modification of my invention and showing the power takeoff and fluid transmitting conduits from the tractor to the trailer;

Figure 11A is a side elevation of the main portion of the trailer, the front end of which is shown in Figure 11;

Figure 12 is a horizontal section through the cylinder shown on the side of the dump wagon in Figure 11A;

Figure 13 is a rear elevation of the power takeoff, pump, and fluid reservoir mounted on the rear end of the tractor;

Figure 14 is a vertical section taken through the pump on the line 14—14 of Figure 16;

Figure 15 is a cross section taken through one of the controlling valves;

Figure 16 is a vertical section taken on the line 16—16 of Figure 13; and

Figure 17 is a horizontal section showing the clutch control, and taken on the line 17—17 of Figure 16.

Figure 2:
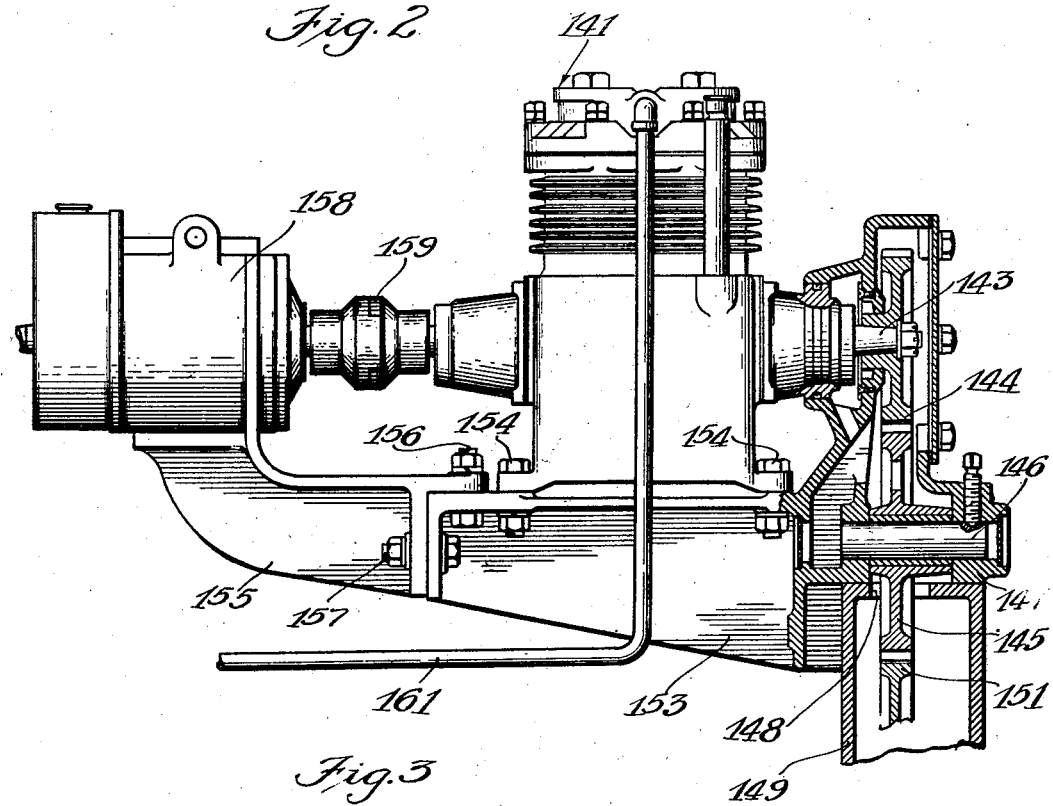
Figure 2 is a side elevation of the power takeoff from the tractor and the air compressor mounted on the front end of the tractor showing also the bracket arrangement for supporting an attached generator.
Figure 3:
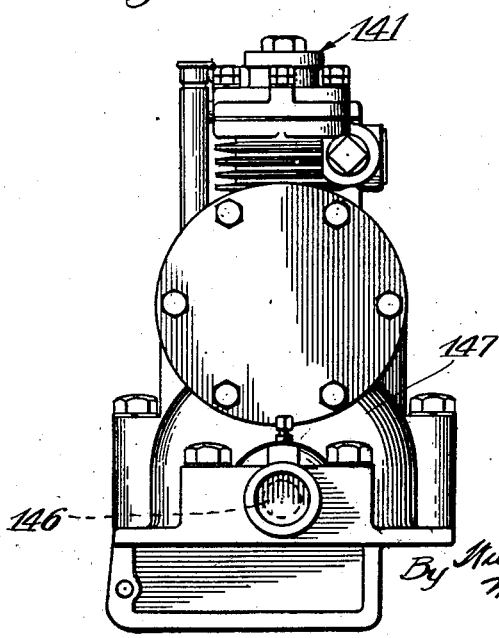
Figure 3 is a front elevation of that shown in Figure 2.

Referring first to Figures 1 to 7 inclusive, a dump wagon designated as a whole by numeral 3 is shown, which consists of a frame including horizontal spaced side channels 4 to which are secured vertical angle bars 5 which support the sheet steel side members 6 of the body. The upper edge of the body is reinforced by longitudinally extending bars 7 and 8 to which are secured adjacent the front end, horizontally extending brackets 9 provided with openings through which are fitted shafts 10 and 11. Between the side frames 4 are disposed two pairs of bottom dump doors 12 and 13 at the front and rear of the body respectively and being sufficiently spaced to provide clearance for the necessary chains and pulleys which operate the same, and which will be hereinafter further described. The doors 12 and 13 are provided with hinge elements 14 having openings 15 therein through which pass cooperating hinge elements 16 secured to the frame 4 by rivets 17 as shown in Figure 1A.

The shape of the hinges consisting of elements 14 and 16 is such that when the doors 13 or 12 swing downwardly, the hinged edges of the doors move laterally so as to completely clear the opening in which the door snugly fits when in closed position. This arrangement permits the load of gravel, stone or the like which may be supported by the doors, to fall clear of the trailer without the necessity of scraping or cleaning around the edges of the door, and more particularly so that the doors may again be closed without intereference from materials being caught between the hinged edges of the doors and the frame to which the doors are hinged.

The free edges of doors 12 are supported by chains 18 and 19, the rear ends of which are coupled to the rear end of chain 21 by the triangular plate 22. The front ends of chains 18 and 19 are fixed to grooved drums 23 and 24 respectively, which are in turn fixed for rotation with the shaft 11. The front end of chain 21 is similarly fixed to a grooved drum 25 on the shaft 11. When the shaft 11 rotates in a clockwise direction as viewed in Figure 4, the forward ends of chains 18, 19, and 21 are wound on their respective drums, and since the free edges of the doors 12 are supported by a portion of the chains 18 and 19, the rotation of the shaft 11 in a clockwise direction causes the doors to be forced to a closed position. The rear ends of chains 18 and 19 pass over sheaves 26 and 27 respectively, which are fixed for rotation with shafts 28 and 29 respectively for the purpose of guiding the chains 18 and 19 and preventing excessive friction. The rear end of chain 21 passes over a similar rotatably mounted sheave 31 for guiding it throughout its range of movement. A cylinder 32, which is mounted on the side of the body, accommodates a piston having a piston rod 33 extending therefrom and connected with a chain 34, the forward end of which is fixed to the grooved drum 25 such that it is unwound from the drum when the drum moves in a clockwise direction and is wound to the drum when moved in the opposite direction.

As will be clearly seen from Figure 4, the doors are closed by means of fluid pressure being applied to the forward side of the piston in the cylinder 32, which causes the shaft 11 to rotate in a clockwise direction and raises the doors in the manner above explained.

The doors 13 are similarly supported by chains 34 and 35, the ends of which are secured to chains 36 and 37 by means of triangular coupling plates 39. These chains pass over sheaves 41, 42, 43 and 44 which guide the same through their range of movement and facilitate the lifting of the doors. Chains 36 and 37 also pass over sheaves 45 and 46 respectively and have their forward ends coupled to a chain 47 by means of a triangular plate 48. The chain 47 is fixed to a grooved drum 49 which is fixed for rotation with the shaft 10. Also fixed to the grooved drum 49 is a chain 51 having its rear end attached to a piston rod 52 extending from cylinder 53 which accommodates a piston on the end of the piston rod 52, the detail construction of which is illustrated in enlarged sectional views hereinafter more specifically described. The closing of the rear doors 13 is effected by applying force to the forward side of the piston in cylinder 53, which causes the drum 49 to rotate in a clockwise direction as viewed in Figure 4 and which winds chain 47 thereon and lifts vertically on the chains 34 and 35 supporting doors 13.

In Figure 7 the mounting of shafts 10 and 11 in journal brackets 54 and 55 fixed to the front end of the body 3 is clearly shown.

For the purpose of holding the doors in any desired position I have provided the shafts 10 and 11 with ratchet wheels 56 which are fixed thereon by keys 57. A housing 58 encloses the ratchet wheels 56 and is journaled at 59 and 60 on the adjacent ends of shafts 10 and 11 for oscillatory movement thereon. The housing 58 carries a shaft 62 on which is mounted two pawls 63 adapted to engage the ratchet wheels 56 when moved toward the ratchet wheels by the rods 64 and 65 which pass longitudinally through the hand lever 66 and are guided in their movement by a sleeve 67 fitted within the lever 66 as shown in Figure 9. Springs 68, the ends of which are secured to the pawls 63 and the housing 58 respectively, normally hold the pawls out of engagement with the wheels 56, but the springs 68 are adapted to yield when pressure is applied through the medium of the rods 64 and 65 by means of the hand grip 69 which is pivoted to a U-shaped collar 71 by means of a bolt 72 as shown in Figures 9 and 10. A shiftable contact member 73 is pivoted to a portion of the hand grip 69 by a bolt 74 and is adapted to be shifted as shown in Figure 10 such that the inner end may engage the end of rod 64 or the ends of rods 64 and 65 at the same time for causing either both of the pawls 63 or only the one attached to rod 64 to engage their respective ratchet wheels 56 for causing the same to be rotated in a clockwise direction upon oscillation of the lever 66. The ratchet wheels 56 are normally engaged by dogs 78 which are pivoted between the forked ends 79 and 80 of a trip lever 81 and between forked ends 82 and 83 of a trip arm 84 and on a shaft 85. The trip arms 81 and 84 are journaled on the shaft 86 and are normally held in the position shown in Figure 8 by means of a relatively stiff tension spring 87, the ends of which are connected to the lower extension 88 on the lever 84 and to an eye bolt 89 passing through laterally extending reinforcing bars 91, 92, and 93.

The lower ends of the dogs 78 are provided with stop members 94 which engage portions of the trip levers 81 and 84 to prevent the upper ends of the dogs from falling away from the ratchet wheels. Brackets 55 are provided with vertically depending web portions or plates 96 on which are formed integral stop members 97 which engage the forked portions of the levers 81 and 84 and limit their movement in a clockwise direction about the shaft 86. The arrangement is such that when the upper ends of trip levers 81 and 84 or either of them are pushed rearwardly, the stop 94 on the lower end of dog 78 leaves contact with its respective arm 81 or 84 as the case may be, and the dog 78 oscillates in a clockwise direction on the shaft 85, causing the same to become disengaged from the ratchet wheel 56 permitting the shaft 10 or 11, as the case may be, to be rotated in a counter clockwise direction by means of the chains supporting the doors 12 and 13 and thereby dumping the load which may be supported by the doors.

The operation as above described may be modified in case the trip arm 84 is operated instead of the arm 81, since, as will be seen in Figure 5, a lug 101 on the forked portion 82 engages a lug 102 on the forked portion 80 of the lever 81 such that when the lever 84 is oscillated about its pivot 86 in a counter clockwise direction the lugs 101 and 102 engage and the lever 81 is also forced to move in a counter clockwise direction for releasing both of the dogs 78 instead of only the one attached to the lever 84. The purpose of this arrangement is to avoid dumping of the doors in the front end of the trailer without dumping the doors in the rear end since if the doors in the front end were dumped while a load remained on the doors in the rear end, the trailer might become overbalanced. The arrangement as described, however, is such that the rear doors may be dumped without dumping the front doors, since there is no danger of overbalancing the trailer forwardly on account of a support at the extreme forward end of the trailer.

If it is desired to dump the rear doors, this may be accomplished by operating the trip arm 81 manually, but if the rear doors and front doors are to be operated simultaneously, this may be accomplished by means of the piston rod 105 which is coupled at 106 to the depending portion 88 of the arm 84. The piston rod 105 may be forced forwardly into the cylinder 107 by admitting fluid under pressure through the conduit 108 which causes the piston on the forward end of the piston rod 105 to draw the rod forwardly and operate the trip lever 84 and indirectly operate the trip lever 81 through the medium of the engaging lugs 101 and 102 shown in Figure 5.

The cylinder 107 is pivotally mounted to the frame 4 by means of a bolt 109 and a bracket 110 fixed to the frame 4 by suitable rivets 111 as shown in Figures 7 and 8.

Referring again to Figures 9 and 10, the shifting handle 112 is yieldingly held in either the position shown in full lines or the position shown in dotted lines by means of a yieldingly held ball 113 engaging in an aperture 114 in the shift lever 112. A spring 115 is interposed between the ball 113 and a set screw 116 which is threaded in a portion of the hand grip 69.

Referring now to Figure 6, which is an enlarged section showing more particularly the details of construction of the cylinders used for operating the drums 25 and 49 and for operating the trip lever 84. Since the cylinders are substantially identical inside, only one will be described which I have designated as a whole as cylinder 32. One end of the cylinder 32 is fixed to one of the vertical angle bars 5 by means of brackets 120 through which passes a pin 122 which also passes through cylindrical apertures 123 in rearwardly extending lugs 124 integral with the head 125 of the cylinder. The head 125 is provided with an annular stop 126, which is adapted to engage a metal cup 127 forming the rear side of the piston. The cup 128 of leather, rubber or similar material engages the forward side of the cup 127 and is held in place by a metal disc 129 all of which are fitted on a reduced portion 130 on the rear end of the piston rod 33 and held in place by a nut 131. The perimeter of the cup 128 frictionally engages the inner surface 132 of the cylinder wall 133 for preventing the escape of pressure fluid from the front end of the cylinder to the rear end. The piston rod 33 passes through a suitable packing gland 134 which is adapted to be lubricated through suitable fittings 135 and 136. The heads 125 and 137 of the cylinder are held from relative longitudinal movement by bolts 138 in any suitable manner as shown in Figure 6.

Fluid under pressure may be forced into the cylinder through the port 138' from the conduit 139 which receives air under pressure from the pump 141 positioned on the front end of the tractor 142 illustrated in Figure 1. As the cylinders 53, 32, and 107 accommodate pistons and piston rods of similar construction, it is thought to be unnecessary to describe each in detail.

In Figures 1 and 2 is shown the air compressor 141, which may be of any conventional type the details of which are not a part of this invention and will not be described. The compressor shaft 143 is driven by a gear 144 which meshes with a similar gear 145 journaled on a shaft 146 in a bracket 147 and extends through an aperture 148 in the motor housing 149 of the tractor and meshes with a gear 151 from which it receives power of operation from the tractor motor. The compressor 141 is mounted on a bracket 153 by means of bolts 154. One end of the bracket 153 is adapted to have secured thereon a bracket 155 by means of bolts 156 and 157, which bracket is adapted to hold a generator 158 which may be connected to the compressor shaft 143 by a coupler 159. The generator 158 may be omitted without detracting from the utility of my invention and when used it is employed in the same way that generators are ordinarily employed on tractors or other motor vehicles.

An air pressure conduit 161 leading from the compressor 141 passes to an air tank 162 on the rear end of the tractor. Air under pressure may pass, either from the compressor directly or from the tank 162 or both, through a conduit 163 to a valve 164, which may be of any conventional design such that by the operation of the control lever 165, air under pressure is admitted to the conduit 166 or to conduit 167 as may be desired, but not to both conduits at the same time.

The conduit 166 through the medium of suitable couplings is connected to the conduit 108 leading to the cylinder 107 which is adapted to operate the tripping mechanism. The conduit 167 is connected to the conduits 139 leading to the cylinders 32 and 53 which are adapted to close the doors 12 and 13 respectively upon receiving air pressure from the conduit.

Referring now to Figures 11 to 17 inclusive which disclose a modification of my invention, the trailer 3 is substantially identical to that shown in Figures 1 and 1A. The doors 12 and 13 are of similar construction and operated in like manner. This modification illustrates the adaptation of my invention to operation by hydraulic pressure instead of air pressure and I have therefore illustrated a hydraulic cylinder 32' used in the place of the air cylinder 32 shown in Figure 1A.

For operating the trip lever 84 I have employed a hydraulic cylinder 107' in place of the air cylinder 107 shown in Figure 1. Since in this modification, as in the one previously described, all the cylinders are of a very similar construction, only the cylinder 32' shown in Figure 12 will be described.

The cylinder heads 125' and 137' are held from relative longitudinal movement by bolts 138'. The cylinder is fixed to the body of the trailer by means of brackets 120' in the manner shown in Figure 6. The piston rod 33' is provided with a piston consisting of a plurality of disc members 168 and 169, the perimeters of which have frictional engagement with the inner surface 132' of the cylinder wall 133'. An inlet conduit 171 leads to the port 172 at the front end of the cylinder and an outlet conduit 173 leads from a port 174 adjacent the rear end of the cylinder. The port 174 has an elongated portion 175 which permits the escape of liquid which might become entrapped beyond the piston when the piston is in the position shown in Figure 12.

Upon admission of liquid to the cylinder 32', the piston rod is forced toward the rear until the forward edge of the port 174 is uncovered, permitting the liquid under pressure to by-pass outwardly through the return conduit 173 and back to the pump.

The pump and clutch mechanism which controls the operation of the pistons in the respective cylinders is shown in Figure 16. A reservoir 178 is mounted on brackets 179 fixed on the rear end of the tractor adjacent the position normally occupied by the tractor driver. The pump 181 comprises two cooperating gears 182 shown in Figure 14, which draw fluid from the reservoir through the pipe line 184 downwardly through port 185, passageway 186 and outwardly through passageway 187 to the pressure conduit 188 shown in Figure 11. The conduit 188 leads to a valve 189, which has an inlet port 191 and two outlet ports 192 and 193 through either of which fluid may be directed by means of the valve element 194 having a passageway 195 therethrough, and which is adapted to be oscillated by means of a vertical rod 196 having on its upper end an operating handle 197, into either the position shown in Fig. 15 or into a position in which the inlet 191 is connected to the outlet 193.

The passageway 192 connects with a conduit 198 which through the medium of suitable couplings leads to the inlet conduit 199 of the cylinder 107'. The passageway 193 empties into the conduit 201, which through the medium of suitable couplings leads to the inlet conduits 171 of the cylinders 32' which are adapted to close the doors. The return lines 173 and 205 from the respective cylinders are joined by means of a suitable fitting 206 and through the medium of suitable couplings connect with a conduit 207 which communicates with the suction port 185 of the pump as shown in Figure 14.

Since it is not desirable to have the pump 181 operating constantly I have provided a clutch consisting of cooperating clutch elements 208 and 209 which connect the shaft 210 with the tractor shaft 211 through the medium of a coupler 212 and a stud shaft 213 which is journaled in bearings 214 mounted on the main pump bracket 215 (see Figure 16). The clutch lever 216 is fixed to a portion 217 fixed to a shaft 218 which is journaled in the upper portion 219 of the bracket 215. A gear segment 221 is fixed to the shaft 218 by a pin 222 and intermeshes with a pinion 223 on one end of a valve shaft 224 on the other end of which is fixed a valve element 225 which may be shifted from the full line position shown in Figure 14 to either of the dotted line positions therein illustrated by oscillation of the gear segment 221. The gear segment 221 is oscillated by oscillation of the clutch lever 216 since they are both fixed to the same shaft 218.

Referring now to Figure 17, an adjustable set screw 227 engages a cam surface 228 on a fixed bracket 229 and is normally held in engagement by means of a coil spring 231 on the shaft 218. When the clutch lever is moved sufficiently downwardly as viewed in Figure 17, the set screw 227 will engage the cam surface 228 at the point 233 which permits the spring 231 to move the clutch lever together with the shaft 228 to the left as shown in Figure 16. As the clutch lever moves to the left, the spaced depending lugs 234 and 235 confine the upper end of the bell crank arm 236 which is pivoted on a shaft 237, and move the upper end of said arm 236 to the left, causing the lower end 238 to move to the right taking with it the clutch element 209, thereby disengaging the clutch and permitting the pump to cease operation.

When the clutch is in its disengaged position as shown in Figure 16, the valve element 225 is in its full line position as shown in Figure 14. When the clutch is first engaged such that the lever 216 is in the position shown in Figure 17, the pump is operating and the valve element 225 assumes the horizontal dotted line position shown in Figure 14. In this position fluid passes through the pump and by-passes back through the valve and through the pump again without creating a pressure and without drawing fluid from the intake. When the clutch lever is moved further upwardly as viewed in Figure 17, the valve element assumes the position shown by the vertical dotted line in Figure 14, which prevents the by-passing of the fluid through the pump and permits fluid to come in through passageway 185, through passageway 186, through the pump, and outwardly through passageway 187 to the cylinders and the position of the valve 189 determines whether the fluid under pressure is being directed to the tripping lever 84 to open the doors, or to the cylinders 32' for closing the doors.

The trailer illustrated in the drawings is suitably coupled to the tractor through the medium of a draw bar 241 and coupling means 242. The front end of the trailer is preferably supported by a set of wheels indicated diagrammatically by the circle 243. The main weight of the trailer is supported by suitable wheels provided with track laying elements indicated diagrammatically at 244 and 245 respectively. It will be apparent that other means for supporting the weight of the trailer may be used without departing from the scope of my invention.

It will also be apparent to those skilled in the art that many variations and modifications may be made throughout the various elements of my invention as herein disclosed and I do not desire to be limited to the specific arrangement herein illustrated and described except as set forth in the appended claims.

I claim as my invention:

1. In a dump wagon, a frame, a load carrying body on said frame, bottom dump doors for said body, door closing means on said body, power operated means for actuating said closing means to close said doors, holding means for said door actuating means, power operated means for releasing said holding means, and means for selectively transmitting power to each of said power operated means.

2. In a dump wagon, a frame, a load carrying bed fixed to said frame, bottom dump doors in said bed, fluid pressure operated pistons operably connected with said doors for closing the same, means for controllably supplying fluid under pressure for actuating said pistons, means for holding said doors in closed position, and power operated means for controllably releasing said holding means.

3. In a dump wagon, a frame, a load carrying bed fixed to said frame, bottom dump doors in said bed, cylinders fixed to said frame, fluid pressure actuated pistons in said cylinders operably connected with said doors for closing the same, means for controllably supplying fluid under pressure to said cylinders, means for holding said doors in closed position, and power operated means for controllably releasing said holding means.

4. In a dump wagon, a frame, a load carrying bed fixed to said frame, bottom dump doors in said bed, a fluid pressure cylinder fixed to said frame, a piston in said cylinder operably connected with said doors and adapted to close said doors upon actuation by fluid pressure in said cylinder, a pawl and ratchet mechanism adapted to hold said doors in closed position, power operated releasing mechanism for said holding means comprising a second cylinder and piston, said second piston being connected with and adapted to trip said pawl and ratchet mechanism to permit said doors to open by gravity, and means for controllably and selectively supplying fluid under pressure to said cylinders.

5. The combination of a dump wagon with a tractor for conveying the same, said dump wagon comprising a frame, a load carrying bed fixed to said frame, bottom dump doors for said bed, power operated mechanism on said frame operably connected with said doors for closing the same, means releasably holding said doors in closed position, other power operated means on said frame adapted to release said holding means and power mechanism on said tractor for supplying and transmitting power to actuate both of said power operated means.

6. The combination of a dump wagon with a tractor for conveying the same, said dump wagon comprising a frame, a load carrying bed fixed to said frame, bottom dump doors for said bed, power operated mechanism on said frame operably connected with said doors for closing the same, pawl and ratchet mechanism on said dump wagon operably connected with said doors for releasably holding them in closed position, power operated means for controllably releasing said holding mechanism, and power mechanism on the tractor adapted to supply power to said power operated means.

7. The combination of a dump wagon with a tractor for conveying the same, said dump wagon comprising a frame, a load carrying bed fixed to said frame, bottom dump doors in said bed hinged to said frame to open downwardly by gravity, a fluid pressure cylinder on said wagon, a piston in said cylinder, means operably connecting said piston to said doors for closing the same, said connecting means including a shaft, a ratchet wheel on said shaft, a dog releasably engaging said ratchet wheel for holding said doors in closed position, power operated mechanism actuated by fluid pressure for releasing said dog, and means on the tractor controllably and selectively supplying fluid under pressure to said cylinder and to said power operated means.

8. The combination of a dump wagon with a tractor for conveying the same, said dump wagon comprising a frame, a load carrying bed fixed to said frame, bottom dump doors in said bed hinged to said frame to open downwardly by gravity, a fluid pressure cylinder on said wagon, a piston in said cylinder, means operably connecting said piston to said doors for closing the same, said connecting means including a shaft, a ratchet wheel on said shaft, a dog releasably engaging said ratchet wheel for holding said doors in closed position, power operated mechanism actuated by fluid pressure for releasing said dog, a fluid pump on said tractor driven by power therefrom, conduits leading from said pump to said cylinder and to said power operated mechanism, and means on the tractor for selectively shutting off the supply of fluid to either of said conduits.

9. The combination of a dump wagon with a tractor for conveying the same, said dump wagon comprising a frame, a load carrying bed fixed to said frame, bottom dump doors in said bed hinged to said frame to open downwardly by gravity, a fluid pressure cylinder on said wagon, a piston in said cylinder, means operably connecting said piston to said doors for closing the same, said connecting means including a shaft, a ratchet wheel on said shaft, a dog releasably engaging said ratchet wheel for holding said doors in closed position, power operated mechanism actuated by fluid pressure for releasing said dog, a fluid pump on said tractor driven by power therefrom, conduits leading from said pump to said cylinder and to said power operated mechanism, means for selectively shutting off the supply of fluid to either of said conduits, and means on the tractor for controlling the operation of said pump.

10. The combination of a bottom dump wagon with a tractor, said wagon comprising a body, a pair of cooperating dump doors hinged to said body to open downwardly by gravity, a fluid actuated piston operably connected to said doors for closing the same, means releasably holding said doors in closed position, including a transversely extending shaft on said body operably connected to said doors, a ratchet wheel on said shaft, a dog engaging said ratchet wheel, a fluid actuated piston operably connected with said dog for disengaging the same from said ratchet wheel, and means on said tractor for supplying fluid under pressure to said pistons.

11. The combination of a bottom dump wagon with a tractor, said wagon comprising a body, a pair of cooperating dump doors hinged to said body to open downwardly by gravity, a fluid actuated piston operably connected to said doors for closing the same, means releasably holding said doors in closed position, including a transversely extending shaft on said body operably connected to said doors, a ratchet wheel on said shaft, a dog engaging said ratchet wheel, a fluid actuated piston operably connected with said dog for disengaging the same from said ratchet wheel, fluid pressure creating mechanism on said tractor actuated by power from said tractor, and means for transmitting fluid under pressure from said mechanism to said pistons.

12. The combination of a bottom dump wagon with a tractor, said wagon comprising a body, a pair of cooperating dump doors hinged to said body to open downwardly by gravity, a fluid actuated piston operably connected to said doors for closing the same, means releasably holding said doors in closed position, including a transversely extending shaft on said body operably connected to said doors, a ratchet wheel on said shaft, a dog engaging said ratchet wheel, a fluid actuated piston operably connected with said dog for disengaging said ratchet wheel, a fluid pressure creating mechanism on said tractor actuated by power from said tractor, a discharge conduit leading from said mechanism, a control valve at one end of said conduit, distributing conduits leading from said valve and adapted to transmit fluid to each of said pistons, said valve including a valve element for selectively diverting fluid from said discharge conduit to either of said distribution conduits.

13. In combination a tractor, a wagon hitched thereto and provided with gates adapted to open, a hydraulic cylinder on the wagon adapted to close the gates, a pump on the tractor adapted to supply pressure fluid to said cylinder, and a valve on the tractor adapted to control the supply of said pressure fluid.

14. In combination a tractor, a wagon hitched thereto having gates adapted to open, a cylinder adapted to close said gates, means adapted to maintain said gates closed, a cylinder adapted to release said means, a pump on the tractor adapted to supply pressure fluid to said cylinders, and a valve on the tractor adapted to control the supply of pressure fluid selectively to said cylinders to open and close the gates.

15. In combination a tractor, a fluid compressor thereon, a wagon having doors adapted to open under the action of the load, a cylinder on the wagon adapted to close said doors, and a flexible conduit between the compressor on the tractor and the cylinder on the wagon whereby pressure fluid may be supplied to said cylinder.

16. In combination a tractor having a fluid compressor thereon, a wagon having gates adapted to open, a cylinder in said wagon adapted to close said gates, a cylinder on said wagon controlling the opening of said gates, flexible conduits between the cylinders on the wagon and the compressor on the tractor, and a valve on said tractor adapted to control the supply of pressure fluid from the compressor selectively to said cylinders.

17. In combination, a tractor, a trailer with a dumping door thereon, a pump on the tractor, hydraulic means on the trailer connected to said pump and adapted to close said dumping door, and a valve on the tractor whereby pressure fluid may be enclosed in said hydraulic means.

18. In combination, a tractor, a trailer with a dumping door thereon, a pump on the tractor, a hydraulic cylinder on the trailer adapted to close said dumping door, a conduit for fluid extending between said pump and cylinder, and a valve on the tractor controlling said conduit whereby fluid under pressure may be enclosed in said hydraulic cylinder.

JOSEPH KUCHAR.